US008253277B2

(12) United States Patent
Lin et al.

(10) Patent No.: US 8,253,277 B2
(45) Date of Patent: Aug. 28, 2012

(54) ELECTRONIC ASSEMBLY PROVIDED WITH A PARALLEL CIRCUIT FOR CONNECTING ELECTRICALLY TO TWO BATTERY UNITS

(75) Inventors: Yih-Neng Lin, Taipei (TW); Rain-Ted Hwang, Taipei (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 252 days.

(21) Appl. No.: 12/648,877

(22) Filed: Dec. 29, 2009

(65) Prior Publication Data

US 2011/0080048 A1    Apr. 7, 2011

(30) Foreign Application Priority Data

Dec. 2, 2009   (TW) .............................. 98141130 A

(51) Int. Cl.
*H02J 1/00* (2006.01)
*H02J 3/00* (2006.01)

(52) U.S. Cl. ................ 307/86; 307/43; 307/48; 307/66; 307/80; 307/85

(58) Field of Classification Search .................... 307/86, 307/70, 43, 64, 48, 66, 69, 80, 85
See application file for complete search history.

(56) References Cited

U.S. PATENT DOCUMENTS 5,598,041 A * 1/1997 Willis ............................. 307/43
6,204,633 B1 * 3/2001 Kitagawa ....................... 320/128

* cited by examiner

*Primary Examiner* — Rexford Barnie
*Assistant Examiner* — Toan Vu
(74) *Attorney, Agent, or Firm* — Chun-Ming Shih

(57) ABSTRACT

An electronic assembly with two battery units includes a system module provided with a preset threshold value and a parallel circuit. The parallel circuit is coupled electrically to the system module, and includes first and second power diverter circuits. Each of first and second power diverter circuit consists of a diode member coupled electrically to a respective battery unit and the system module and an operation switch that is coupled electrically to the diode member in parallel manner and that is coupled electrically to the respective battery unit and the system module in such a manner that a normal bias voltage is existed between the respective battery unit and the system module.

5 Claims, 5 Drawing Sheets

ELECTRONIC ASSEMBLY PROVIDED WITH A PARALLEL CIRCUIT FOR CONNECTING ELECTRICALLY TO TWO BATTERY UNITS

This application claims the benefit of the Taiwan Patent Application Serial NO. 098141130, filed on Dec. 2, 2009, the subject matter of which is incorporated herein by reference.

BACKGROUND OF THE INVENTION

1. Field of the Invention

The present invention relates to an electronic assembly, more particularly to an electronic assembly having a parallel circuit for connecting to battery units. Book number 2. Description of the Prior Art Due to advance in the electronic technology, an electronic assembly or device becomes indispensable to our daily life. As for a notebook computer, power source is a must for without it the notebook computer does not work.

Generally, there are two ways of power supply to a conventional notebook computer; (i) it is connected to an external power source; (ii) it is provided with a carried-along battery unit. The external power source to be connected to the notebook computer is not always available everywhere and since the attached battery unit can supply electrical power only for a few hours; the user is often left in a state, where he cannot use the computer when the battery unit runs out of power.

According to the prior technology, a battery compartment is provided in the conventional electronic assembly in order to install an extra battery unit. In case the electronic assembly is provided with two battery units, the battery units are usually connected electrically to each other in series via two switches. In order to supply power source from one of the battery units for operation of the notebook computer, a respective switch must be switched ON. Since only the battery unit connected to the respective switch in series is supplying power source to the notebook computer, the plug or cable interconnecting the battery unit and the notebook computer is not hot pluggable. In other words, in case the user wishes to replace the battery unit due to weak power while the notebook computer is in application, he must first of all de-activate the computer set. Then only, he can remove the battery unit for replacing with new ones.

SUMMARY OF THE INVENTION

The main object of the present invention is to provide an electronic assembly having at least two battery units connected electrically to each other in parallel manner. A parallel circuit is employed in the present electronic assembly in order to optionally control the desired battery unit to supply the main electrical power source for operation of the electronic assembly while the reserved battery unit also simultaneously supplies electrical power source to the electronic assembly.

The electronic assembly of the present invention is adapted to be coupled electrically to a first battery unit and a second battery unit in order to receive a first electrical power and a second electrical power. The electronic assembly accordingly includes a system module and a parallel circuit. The system module is provided with a preset threshold current value. The parallel circuit is coupled electrically to the system module, and includes a first power diverter circuit and a second power diverter circuit.

The first power diverter circuit consists of a first diode member that is coupled electrically to the first battery unit and the system module in such a manner that a first normal bias voltage is existed between the first battery unit and the system module, and a first operation switch that is coupled electrically to the first diode member in parallel manner and that is coupled electrically to the first battery unit and the system module.

The second power diverter circuit consists of a second diode member that is electrically coupled to the second battery unit and the system module in such a manner that a second normal bias voltage is existed between the second battery unit and the system module, and a second operation switch that is coupled electrically to the second diode member in parallel manner and that is coupled electrically to the second battery unit and the system module.

When the electronic assembly of the present invention is in a first power supply condition, the first electrical power is supplied via the first diode member to the system module, which, transmits a first switch signal and a second switch signal to the first operation switch and the second operation switch respectively, thereby switching the first operation switch ON and switching the second operation switch OFF in order to supply the first electrical power to the system module via the first operation switch. When the second electrical power is greater than the threshold current value, the system module is capable of transmitting the first switch signal and the second switch signal to the first operation switch and the second operation switch, thereby switching the first operation switch OFF and switching the second operation switch ON to convert the electronic assembly into a second power supply condition, where the second electrical power is supplied to the system module via the second operation switch.

In one preferred embodiment, the first battery unit and the second battery unit are coupled electrically to the system module for transmitting a first battery data and a second battery data to the system module. The first battery data and the second battery data respectively have at least a voltage value or a current value or both.

In another preferred embodiment, the electronic assembly is adapted to be coupled electrically to a power source module so as to be disposed in a first charging condition such that the system module transmits the first and second switch signals respectively to the first and second operation switches, thereby switching the first operation switch ON and switching the second operation switch OFF, where a first charge power from the power source module is charged into the first battery unit via the first operation switch. When a voltage of the first battery unit is greater than the threshold current value, the system module is capable of transmitting the first switch signal and the second switch signal to the first operation switch and the second operation switch, thereby switching the first operation switch OFF and switching the second operation switch ON to convert the electronic assembly into a second charging condition, where a second charge power from the power source module is charged into the second battery unit via the second operation switch.

In compare to the prior art electronic assembly, the electronic assembly of the present invention uses a parallel circuit to decide which battery unit is chosen for supplying the main electrical power source while the remaining battery unit also supply the electrical power source such that in case the selected battery unit runs out of power, the power supply operation is transferred to the remaining battery unit. Thus, the present electronic assembly is hot pluggable, i.e., in case one battery unit runs out of power during use of the assembly and the user wishes to replace a new battery unit, he can do so without the need to de-activate the electronic assembly in use, thereby facilitating the application of the present electronic assembly.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
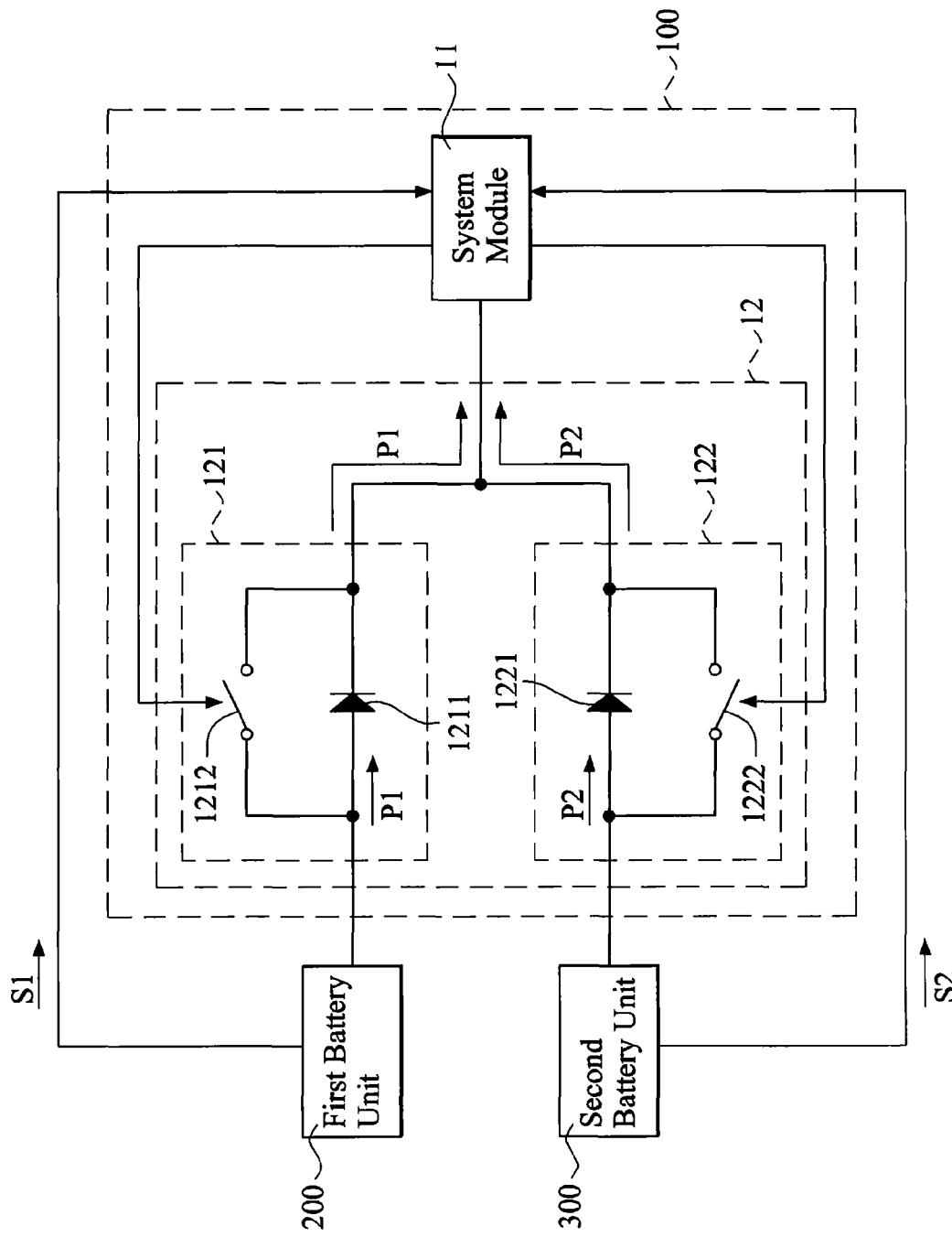
FIG. 1 shows a diagram representing an electronic assembly of the present invention.

FIG. 1 shows a diagram representing an electronic assembly of the present invention. As illustrated, the present electronic assembly 100 is adapted to be coupled electrically to a first battery unit 200 and a second battery unit 300 in order to receive a first electrical power P1 and a second electrical power P2 respectively. The electronic assembly 100 accordingly includes a system module 11 and a parallel circuit 12.

The system module 11 is provided with a preset threshold current value. In this embodiment, the first and second battery units 200, 300 are coupled electrically to the system module 11 for transmitting of a first battery data S1 and a second battery data S2 to the system module 11. Preferably, the first battery data S1 and the second battery data S2 may include at least a voltage value or a current value or a voltage value and a current value simultaneously.

The parallel circuit 12 is coupled electrically to the system module 11, and includes a first power diverter circuit 121 and a second power diverter circuit 122.

The first power diverter circuit 121 consists of a first diode member 1211 and a first operation switch 1212. The first diode member 1211 is coupled electrically to the first battery unit 200 and the system module 11 in such a manner that a first normal bias voltage is existed between the first battery unit 200 and the system module 11. The first operation switch 1212 is coupled electrically to the first diode member 1211 in parallel manner and is further coupled electrically to the first battery unit 200 and the system module 11.

The second power diverter circuit 122 consists of a second diode member 1221 and a second operation switch 1222. The second diode member 1221 is coupled electrically to the second battery unit 300 and the system module 11 in such a manner that a second normal bias voltage is existed between the second battery unit 30 and the system module 11. The second operation switch 1222 is coupled electrically to the second diode member 1221 in parallel manner and is further coupled electrically to the second battery unit 300 and the system module 11.

Figure 2:
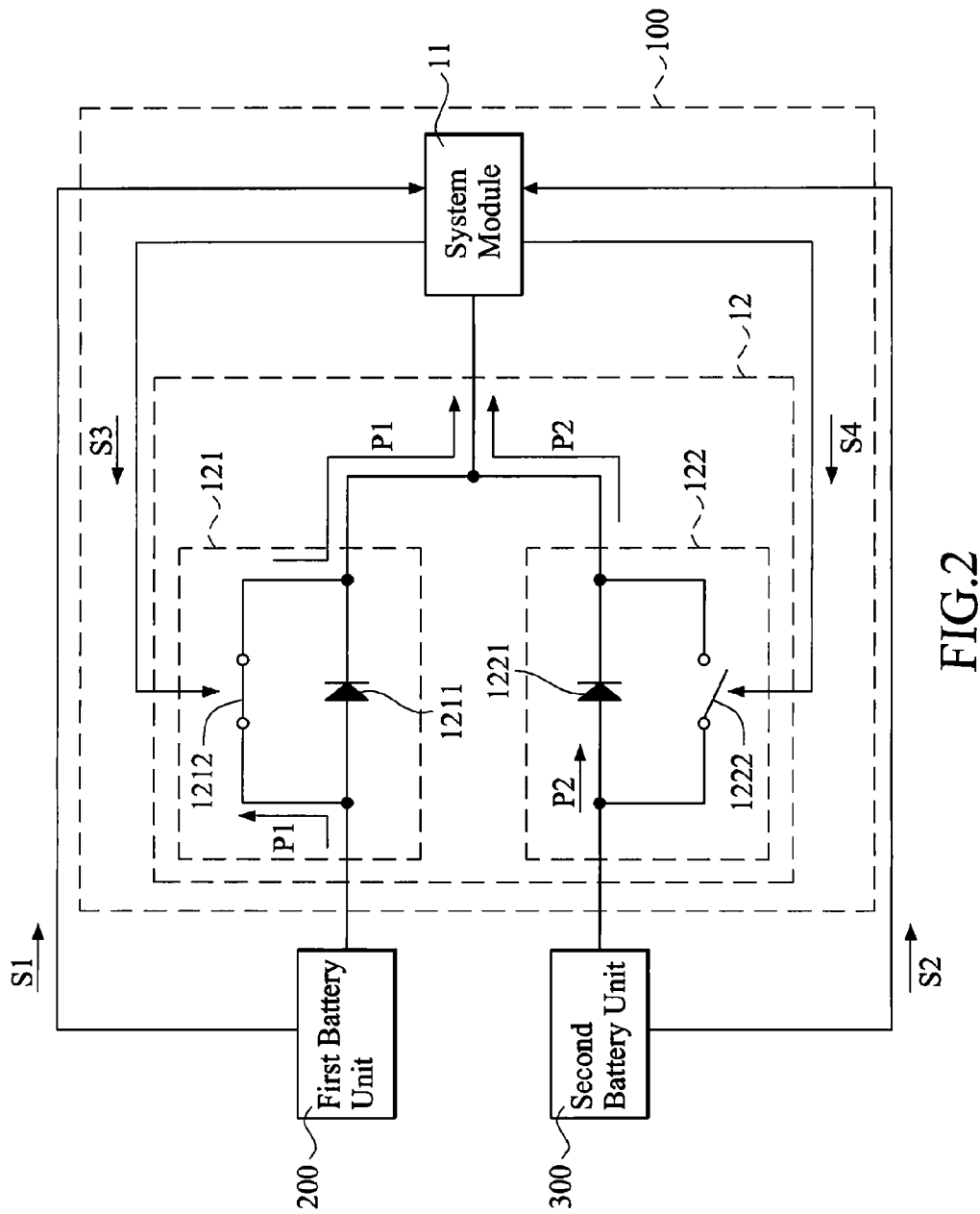
FIG. 2 shows a diagram representing the electronic assembly of the present invention in a first power supply condition.

Referring to FIGS. 1 and 2, wherein, FIG. 2 shows a diagram representing the electronic assembly of the present invention in a first power supply condition. When the electronic assembly 100 of the present invention is in the first power supply condition, the first electrical power P1 is supplied via the first diode member 1211 to the system module 11, which, transmit a first switch signal S3 and a second switch signal S4 to the first operation switch 1212 and the second operation switch 1222, thereby switching the first operation switch 1212 ON and switching the second operation switch 1222 OFF in order to supply the first electrical power P1 to the system module 11 via the first operation switch 1212.

Because, the first electrical power P1 from the first battery unit 200 is supplied to the system module 11 without passing through the first diode member 1211, there is no loss of the first normal bias voltage so that the voltage at two ends of the first power diverter circuit 121 is not reduced, thereby providing an effective power supply to the system module 11. Because, when the electronic assembly 100 of the present invention is in the first power supply condition, the second battery unit 300 is not connected electrically to the second diode member 1221, the second electrical power P2 supplied by the second battery unit 300 is tremendously smaller than the first electrical power P1 from the first battery unit 200. In other words, by transmitting the first switch signal S3 and the second switch signal S4 to the first operation switch 1212 and the second operation switch 1222, the first operation switch 1212 can be switched ON while the second operation switch 1222 is switched OFF, thereby permitting the first battery unit 200 to supply the first electrical power P1 to the electronic assembly 100 and simultaneously permitting the second battery unit 300 is electrical communication with the assembly 100. Under this condition, one of the first and second battery units 200, 300 is hot pluggable, i.e., replacing the power-down battery unit with a new ones does not hinder the electronic assembly 100 under operation.

Figure 3:
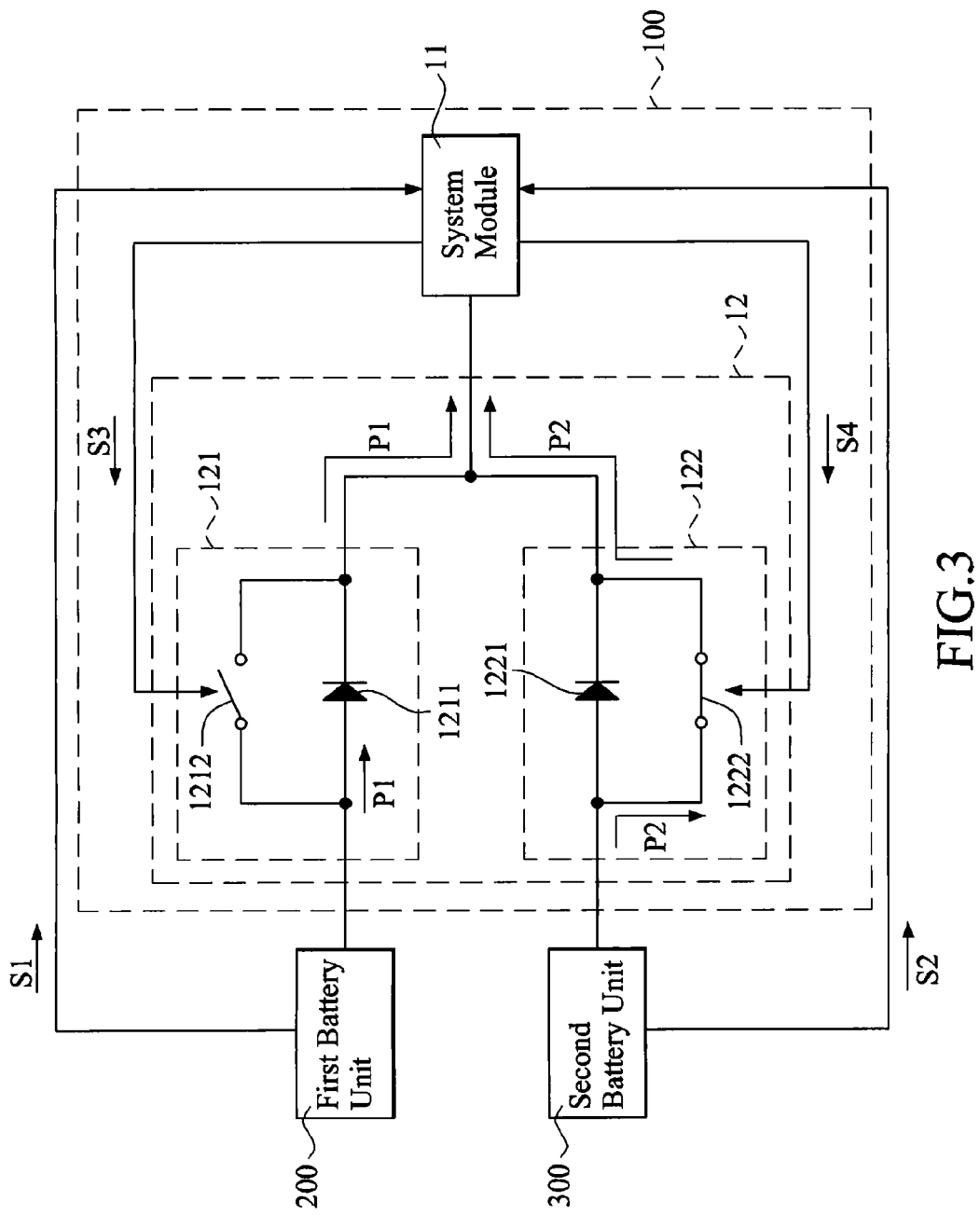
FIG. 3 shows a diagram representing the electronic assembly of the present invention in a second power supply condition.

Referring to FIGS. 2 and 3, wherein FIG. 3 shows a diagram representing the electronic assembly 100 of the present invention in a second power supply condition. When the first electrical power P1 gradually lowers due to continued power supply, flow of the second electrical power P2 is increased such that in case the system module 11 detects via the second battery data S2 that the second electrical power P2 is greater than the threshold current value. The system module 11 transmits the first switch signal S3 and the second switch signal S4 to the first operation switch 1212 and the second operation switch 1222, thereby switching the first operation switch 1212 OFF and switching the second operation switch 1222 ON to convert the electronic assembly 100 into the second power supply condition, where the second electrical power P2 is supplied to the system module 11 via the second operation switch 1222.

At this time, since the second electrical power P2 is supplied to the system module 11 without passing through the second diode member 1221, there is no loss of the second normal bias voltage so that the voltage at two ends of the second power diverter circuit 122 is not reduced, thereby providing an effective power supply to the system module 11. Because, the first electrical power P1 is decreased, the first electrical power P1 is tremendously smaller than the second electrical power P2. In other words, when the first battery unit 200 runs low of the power, flow of the second electrical power P2 is gradually increased such that in case the first battery unit 200 is removed for replacement, supply of the second electrical power P2 can be continued effectively since the second electrical power P2 needs not pass through the second diode member 1221.

Moreover, in case the electronic assembly 100 of the present invention is provided only with the first battery unit 200, the system module 11 is required to transmit only the first switch signal S3 to the first operation switch 1212, thereby switching the first operation switch 1212 ON in order to permit supply of the first electrical power P1 for operation of the present electronic assembly 100.

Figure 4:
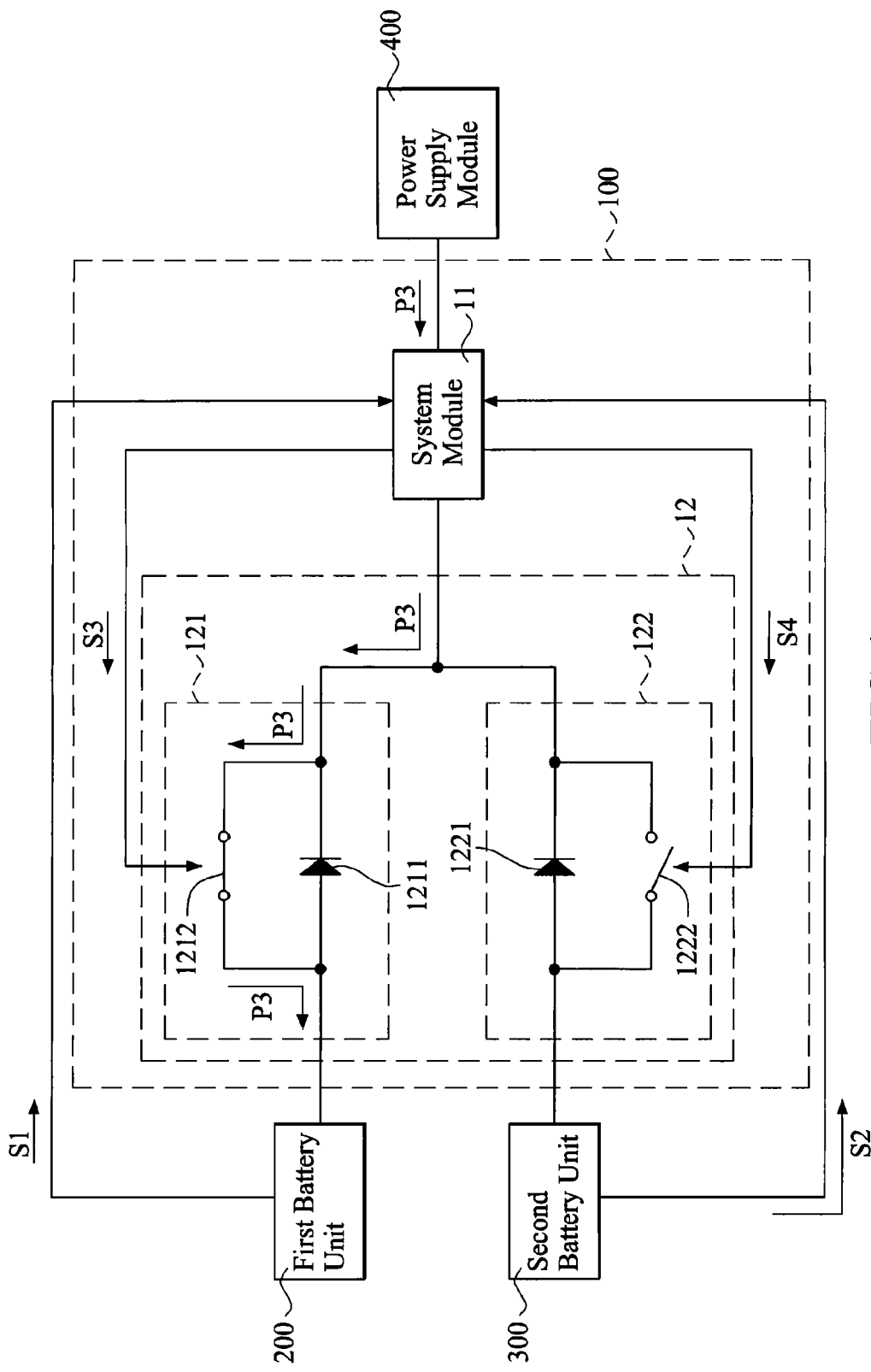
FIG. 4 shows a diagram representing the electronic assembly of the present invention in a first charging condition due to electrically coupling to a power source module.

FIG. 4 shows a diagram representing the electronic assembly of the present invention in a first charging condition due to electrically coupling to a power source module. As illustrated, the electronic assembly 100 of the present invention is adapted to be coupled electrically to the power source module 400 so as to convert the electronic assembly into a first charging condition such that the system module 11 transmits the first and second switch signals S3, S4 respectively to the first and second operation switches 1212, 1222, thereby switching the first operation switch 1212 ON and switching the second operation switch 1222 OFF, where a first charge power P3 from the power source module 400 is charged into the first battery unit 200 via the first operation switch 1212.

Figure 5:
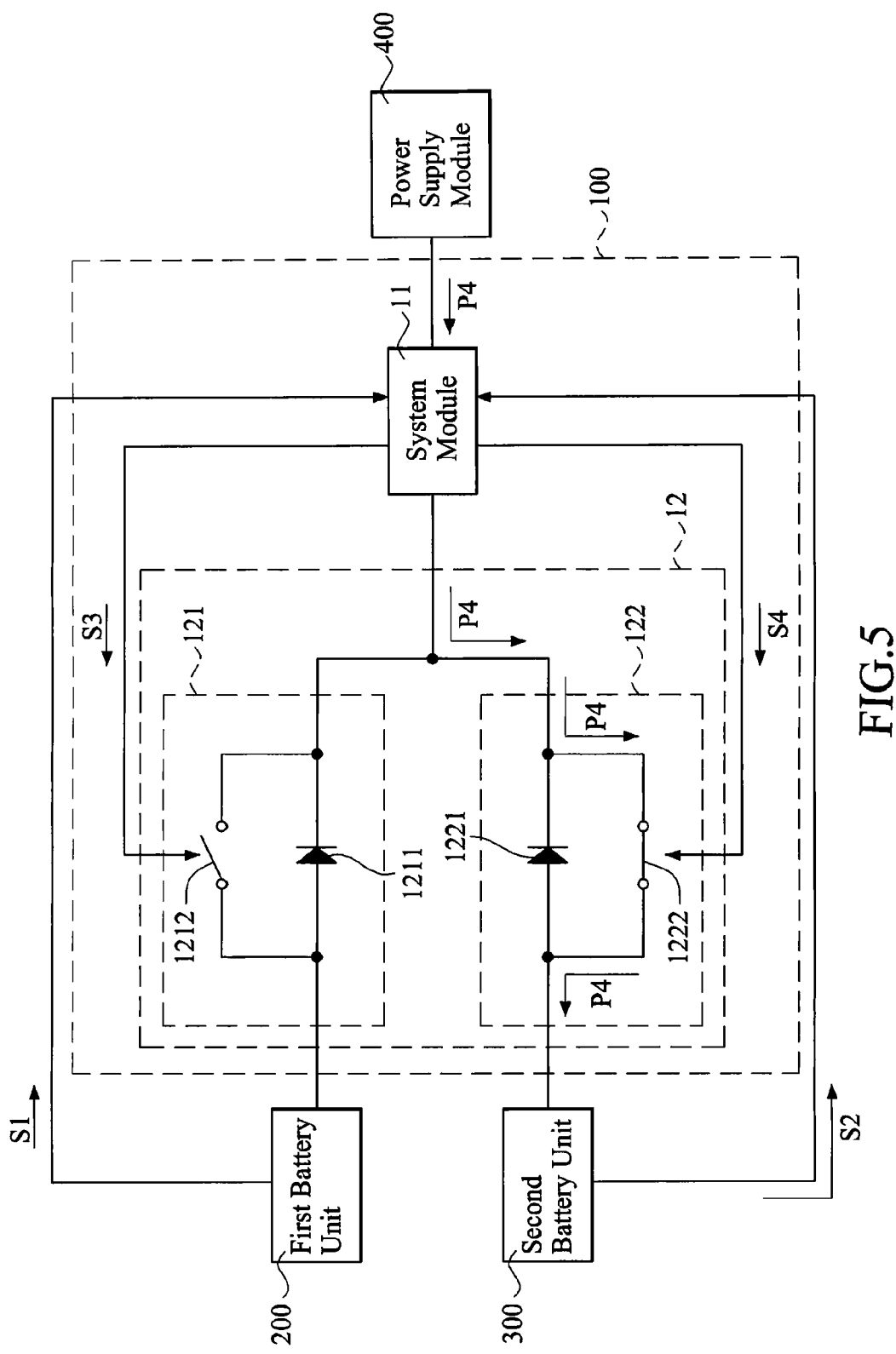
FIG. 5 shows a diagram representing the electronic assembly of the present invention in a second charging condition due to electrically coupling to a power source module.

FIG. 5 shows a diagram representing the electronic assembly of the present invention in a second charging condition due to electrically coupling to the power source module 400 (generally called domestic power). As illustrated, when a voltage of the first battery unit 200 is greater than the threshold current value, the system module 11 is capable of transmitting the first switch signal S3 and the second switch signal S4 to the first operation switch 1212 and the second operation switch 1222 respectively, thereby switching the first operation switch 1212 OFF and switching the second operation switch 1222 ON to convert the electronic assembly into the second charging condition, where a second charge power P4 from the power source module 400 is charged into the second battery unit 300 via the second operation switch 1222. Note that in the present embodiment, the preset threshold current value is equivalent to the current value of the fully charged first battery unit 200.

Moreover, in case the electronic assembly 100 of the present invention is provided only with the first battery unit 200, the system module 11 is required to transmit only the first switch signal S3 to the first operation switch 1212, thereby switching the first operation switch 1212 ON in order to permit charging of the first charge power P3 to the first battery unit 200 via the first operation switch 1212.

As illustrated above, the electronic assembly 100 of the present invention includes the parallel circuit 12 for optionally control the desired battery unit to supply the main electrical power source for operation of the electronic assembly while the reserved battery unit also simultaneously supplies electrical power source to the electronic assembly. Under this condition, the present electronic assembly is hot pluggable, i.e., in case one battery unit runs out of power during use of the assembly and the user wishes to replace a new battery unit, he can do so without the need to de-activate the electronic assembly 100 in use. In addition, when the present electronic assembly 100 is connected electrically to the power source module 400 (generally called domestic power); the battery units installed therein are selectively charged, thereby facilitating the application of the present electronic assembly 100.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic assembly adapted to be coupled electrically to a first battery unit and a second battery unit, the electronic assembly comprising:
   a system module provided with a threshold value;
   a parallel circuit coupled electrically to said system module, and including
      a first power diverter circuit consisting of a first diode member that is electrically coupled to the first battery unit and said system module in such a manner that a first normal bias voltage is existed between the first battery unit and said system module and a first operation switch that is coupled electrically to said first diode member in parallel manner and that is coupled electrically to the first battery unit and said system module, and
      a second power diverter circuit consisting of a second diode member that is electrically coupled to the second battery unit and said system module in such a manner that a second normal bias voltage is existed between the second battery unit and said system module, and a second operation switch that is coupled electrically to said second diode member in parallel manner and that is coupled electrically to the second battery unit and said system module;
   wherein, when the electronic assembly is in a first power supply condition, a first current is supplied via said first diode member to said system module, which, transmits a first switch signal and a second switch signal to said first operation switch and said second operation switch respectively, thereby switching said first operation switch ON and switching said second operation switch OFF in order to supply the first electrical power to said system module via said first operation switch;
   wherein, when a second current is greater than said threshold value, said system module is capable of transmitting said first switch signal and said second switch signal to said first operation switch and said second operation switch respectively, thereby switching said first operation switch OFF and switching said second operation switch ON to convert the electronic assembly into a second power supply condition, where the second electrical power is supplied to said system module via said second operation switch.

2. The electronic assembly according to claim 1, wherein the first battery unit and the second battery unit further being coupled electrically to said system module for transmitting a first battery data and a second battery data to said system module.

3. The electronic assembly according to claim 2, wherein said first battery data and said second battery data respectively have at least a voltage value or a current value or a voltage value and a current value simultaneously.

4. The electronic assembly according to claim 1, wherein when the electronic assembly is coupled electrically to a power source module, the electronic assembly is disposed in a first charging condition such that said system module transmits said first and second switch signals respectively to said first and second operation switches, thereby switching said first operation switch ON and switching said second operation switch OFF, where a first charge power from said power source module is charged into said first battery unit via said first operation switch.

5. The electronic assembly according to claim 4, wherein when a voltage of the first battery unit is greater than said threshold value, said system module is capable of transmitting said first switch signal and said second switch signal to said first operation switch and said second operation switch respectively, thereby switching said first operation switch OFF and switching said second operation switch ON to convert the electronic assembly into a second charging condition, where a second charge power from said power source module is charged into said second battery unit via said second operation switch.

* * * * *